US008851503B2

(12) United States Patent
Tyson, III

(10) Patent No.: US 8,851,503 B2
(45) Date of Patent: Oct. 7, 2014

(54) DUAL-CHAIR BEACH WAGON

(76) Inventor: Robert L. Tyson, III, Raleigh, NC (US)

(*) Notice: Subject to any disclaimer, the term of this patent is extended or adjusted under 35 U.S.C. 154(b) by 99 days.

(21) Appl. No.: 13/562,102

(22) Filed: Jul. 30, 2012

(65) Prior Publication Data

US 2012/0292952 A1     Nov. 22, 2012

Related U.S. Application Data

(63) Continuation-in-part of application No. 12/585,768, filed on Sep. 24, 2009, now Pat. No. 8,297,642.

(60) Provisional application No. 61/136,739, filed on Sep. 29, 2008.

(51) Int. Cl.
| B62B 3/02 | (2006.01) |
| A47C 13/00 | (2006.01) |
| A47C 7/00 | (2006.01) |
| A47C 1/14 | (2006.01) |
| B62B 9/14 | (2006.01) |
| B62B 5/06 | (2006.01) |

(52) U.S. Cl.
CPC ............... *A47C 1/14* (2013.01); *B62B 2202/52* (2013.01); *B62B 9/147* (2013.01); *A47C 7/006* (2013.01); *B62B 5/067* (2013.01); *B62B 3/02* (2013.01); *B62B 2207/02* (2013.01); *B62B 2205/104* (2013.01); *B62B 2206/006* (2013.01); *B62B 2301/05* (2013.01)
USPC .......................................... 280/648; 297/129

(58) Field of Classification Search
USPC ................. 280/43, 43.1, 43.14, 43.24, 47.18, 280/47.25, 47.34, 87.01, 643, 648, 638, 280/639; 297/34, 63, 67, 129, 245, 31
See application file for complete search history.

(56) References Cited

U.S. PATENT DOCUMENTS

| 1,787,245 | A | * | 12/1930 | Graham et al. ................ 297/125 |
| 4,376,547 | A |   | 3/1983  | Dominko |
| 4,659,142 | A | * | 4/1987  | Kuchinsky, Jr. ............... 297/118 |
| 4,703,944 | A |   | 11/1987 | Higson |
| 4,735,426 | A |   | 4/1988  | McConnell |
| 4,934,719 | A |   | 6/1990  | duPont |
| 5,040,807 | A |   | 8/1991  | Snover |
| 5,120,071 | A |   | 6/1992  | Thibault et al. |
| 5,356,160 | A |   | 10/1994 | Urlwin |
| 5,362,079 | A |   | 11/1994 | Graham |
| 5,364,112 | A |   | 11/1994 | Jackson |
| 5,492,347 | A |   | 2/1996  | Palmeri et al. |
| 5,529,375 | A | * | 6/1996  | English ........................ 297/248 |
| 5,857,695 | A |   | 1/1999  | Crowell |
| 5,863,053 | A | * | 1/1999  | Berry ........................... 280/32.6 |
| 5,971,483 | A |   | 10/1999 | Brenneman |

(Continued)

*Primary Examiner* — Frank Vanaman
(74) *Attorney, Agent, or Firm* — Richard C. Litman

(57) ABSTRACT

The dual-chair beach wagon includes attachable beach chairs with removable wheels that convert the beach chairs into a rolling wagon for transport of beach paraphernalia. The beach chairs have arm latches and frame brackets that allow them to be removably connected together at opposing front ends to form the wagon. When disconnected each chair serves as a standard beach chair. The removably attachable wheels attach to adjustable rear legs of the beach chairs. In preparation for beach wagon mode, the front legs can be folded up and secured with a recessed leg lock to facilitate attachment of the two chairs using the arm latches and frame brackets to form the beach wagon. A pull rod is attachable to one end of the dual chair configuration. Wheels on the pull rod attachment end of the dual chair configuration have independently pivotal axles to facilitate steering of the wagon transport.

14 Claims, 7 Drawing Sheets

(56) References Cited

U.S. PATENT DOCUMENTS

| | | | |
|---|---|---|---|
| 6,079,777 A | 6/2000 | Simmons et al. | |
| 6,131,925 A * | 10/2000 | Weldon | 280/30 |
| 6,264,216 B1 * | 7/2001 | Wilson | 280/30 |
| 6,312,048 B1 | 11/2001 | Kilmer | |
| 6,315,306 B1 | 11/2001 | Fernie et al. | |
| 6,527,294 B1 * | 3/2003 | Brewington et al. | 280/647 |
| 6,676,140 B1 * | 1/2004 | Gondobintoro | 280/33.993 |
| 7,475,889 B2 * | 1/2009 | Marmah et al. | 280/47.26 |
| 2002/0030350 A1 | 3/2002 | Brotherston | |
| 2002/0096856 A1 | 7/2002 | Byrd | |
| 2002/0158444 A1 * | 10/2002 | DeTournay | 280/491.2 |
| 2004/0178665 A1 | 9/2004 | May | |
| 2004/0183265 A1 | 9/2004 | Vecchio | |
| 2004/0207240 A1 | 10/2004 | Tondino | |
| 2006/0001242 A1 | 1/2006 | Fulks | |
| 2006/0071513 A1 | 4/2006 | Pedemonte | |
| 2010/0044984 A1 * | 2/2010 | Cohen et al. | 280/47.38 |

\* cited by examiner

DUAL-CHAIR BEACH WAGON

CROSS-REFERENCE TO RELATED APPLICATION

This application is a continuation-in-part of my prior U.S. patent application Ser. No. 12/585,768, filed Sep. 24, 2009, now U.S. Pat. No. 8,297,642, which claimed priority to U.S. Provisional Patent Application Ser. No. 61/136,739, filed Sep. 29, 2008.

BACKGROUND OF THE INVENTION

1. Field of the Invention

The present invention relates generally to portable seating, and more specifically to a dual-chair beach wagon that combines beach chairs to create a beach wagon.

2. Description of the Related Art

A beach wagon is very desirable for beach goers (families) who take lots of items from their car/house to the beach when packing for a day at the beach. Many families take large children's wagons loaded down with beach chairs, beach umbrella, towels, coolers, and beach toys etc. when packing for a day at the beach. The Dual-Chair Beach Wagon concept consolidates the beach chairs and beach wagon into one multi-purpose item that can reduce some of the many separate items families haul down to the shore.

Also, it would be desirable to have an item that reduces a beach wagon storage area needed in a family's vehicle. So many families have to deal with negotiating space to pack a wagon when packing it on a trip to the beach for the convenience of carrying all their beach items to the shore. The concept of a dual-chair beach wagon reduces the storage of a beach wagon down to the storage area of two folded beach chairs.

Thus, a dual-chair beach wagon solving the aforementioned problems is desired.

SUMMARY OF THE INVENTION

The dual-chair beach wagon includes attachable beach chairs with removable wheels that convert the beach chairs into a rolling wagon for transport of beach paraphernalia. The beach chairs have arm latches and frame brackets that allow them to be removably connected together at opposing front ends to form the wagon. When disconnected, each chair serves as a standard beach chair. The removably attachable wheels attach to adjustable rear legs of the beach chairs. In preparation for beach wagon mode, the front legs can be independently folded up and secured by a recessed leg lock to facilitate attachment of the two chairs using the arm latches and frame brackets to form the beach wagon. A pull rod is attachable to one end of the dual chair configuration. Wheels on the pull rod attachment end of the dual chair configuration have independently pivotal axles to facilitate steering of the wagon transport.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
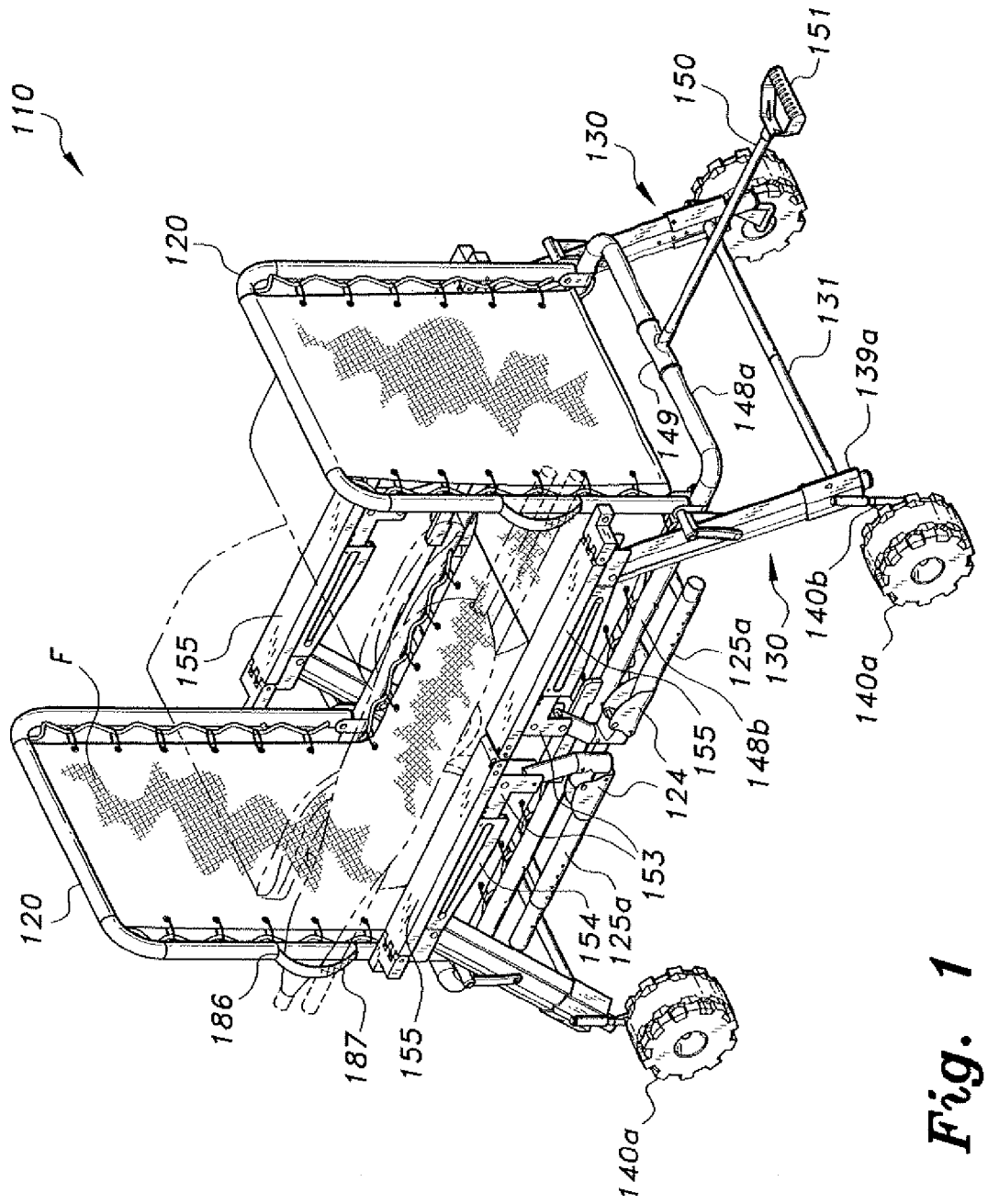
FIG. 1 is a perspective view of the dual-chair beach wagon according to the present invention, shown in a wagon configuration.
Figure 2:
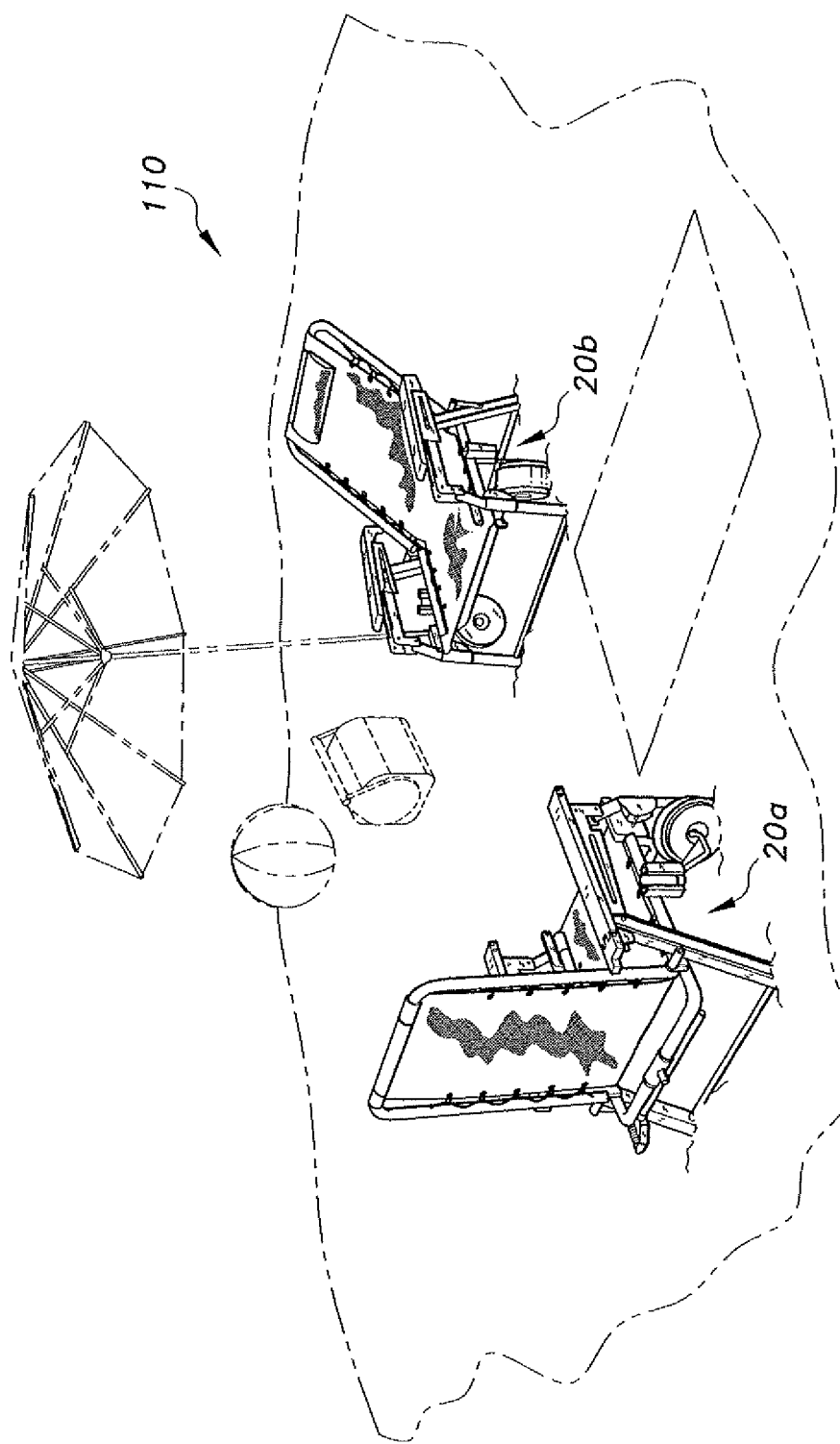
FIG. 2 is an environmental perspective view of the dual-chair beach wagon according to the present invention, shown in a separated beach chair configuration.
Figure 3:
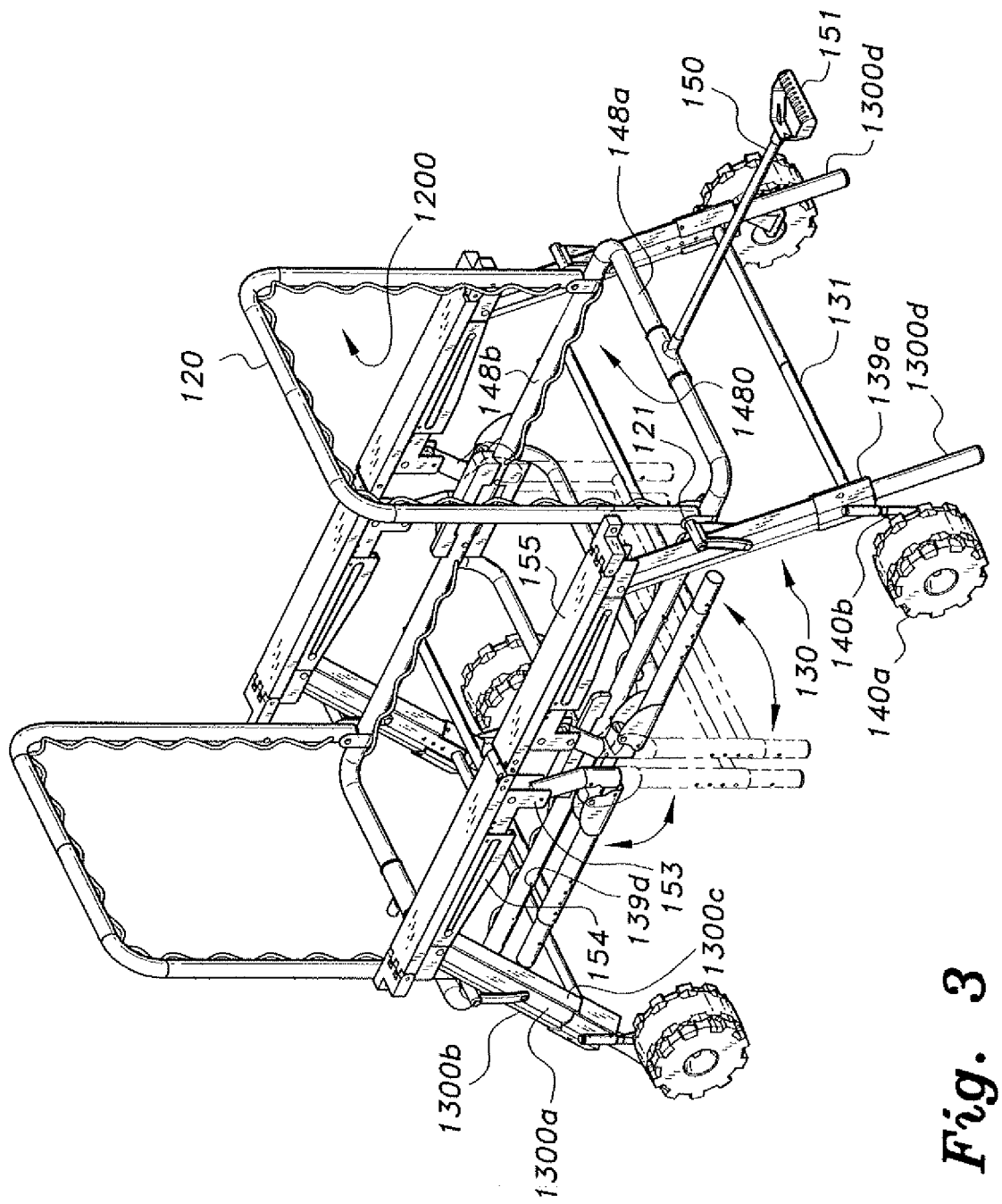
FIG. 3 is a perspective view of the frame structure of the dual-chair beach wagon according to the present invention.

As shown in FIGS. 1 and 2, the dual-chair beach wagon 110 comprises a pair of collapsible beach chairs 20a and 20b removably attachable to each other in an opposing configuration to form a wagon, the arms, seatbacks and seats of the chairs forming a peripheral enclosure capable of carrying beach paraphernalia, and the like. As shown in FIG. 3, the chair seats are formed from U-shaped seat frame members including rear loop portion 148a and elongate open ended portion 148b. The seatbacks are formed from U shaped seat back members 120. Fabric F is attached to the seat back members 120 and seat frame members 148a, 148b. When the chairs 20a and 20b are joined together additional portions of fabric extending from each chair's seat frame member may be joined together, e.g., by a zipper, to form a bottom seal covering the gap between the two seat frames. The back members 120 are pivotally attached to the seat members proximate loop portion 148a. As shown in FIG. 1, for each chair, a strap sleeve 186 is disposed on a side of the seat back member 120. A strap 187 extends from an upper part of the strap sleeve 186 and connects to a lower part of the strap sleeve 186. Beach umbrellas and other long beach paraphernalia can be stored by suspension between straps 187 of the opposing chairs in the beach wagon configuration.

Rear legs 130 are pivotally attached by a swinging U-bracket to the seat members proximate loop portion 148a and extend downward therefrom. The swinging U-bracket comprises a pivoting cylinder 121 pivotally attached to and extending from seat member 148b, and an elongate attachment bar 122, which attaches to a mid-section of the rear leg 130. Wheels 140a are removably attachable to the rear legs 130 of the beach chairs. An elongate pull rod 150 having a handle 151 is pivotally attached via a pull rod attachment collar 149 to one of the rear loop portions 148a and assists a user, who can grab the handle 151 and pull the wheeled device 110 to a desired location before breaking the device 110 down into the separate chairs.

The chairs individually are strengthened by an A frame configuration formed by pivotal attachment of the rear legs 130 to the seat U-frame members 148a and 148b, pivotal attachment of front legs 125a and telescoping front leg extensions 125b to the seat U frame members 148a and 148b, and pivotal attachment of arm stationary ratchet slot member 153 to the rear leg 130 and to front leg tubular attachment elbow bracket 625.

In the beach wagon configuration, the wagon is strengthened by a compound A-frame formed by a joint at U-frame elongate portions 148b proximate open ends thereof, and a joint at front portion of an arm rest and pawl assembly 155. The joint proximate the open end of member 148b utilizes a compound coupling bracket 160 and 159 that is welded onto or otherwise rigidly attached to the tubular member 148b.

Figure 4:
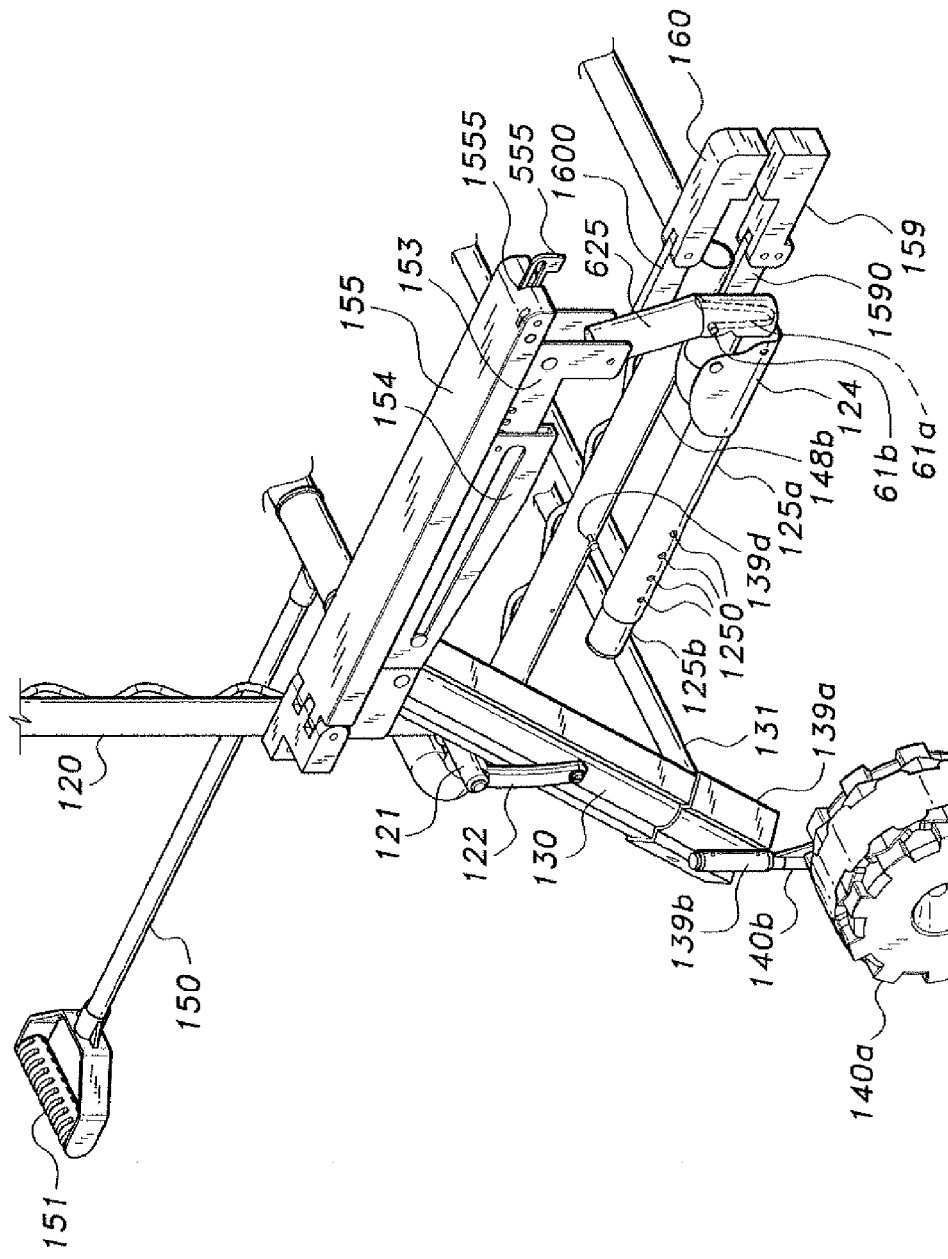
FIG. 4 is a partial perspective view of the frame structure of the dual-chair beach wagon according to the present invention, shown 180° from the configuration of FIG. 3 and on an enlarged scale to show details thereof.
Figure 6:
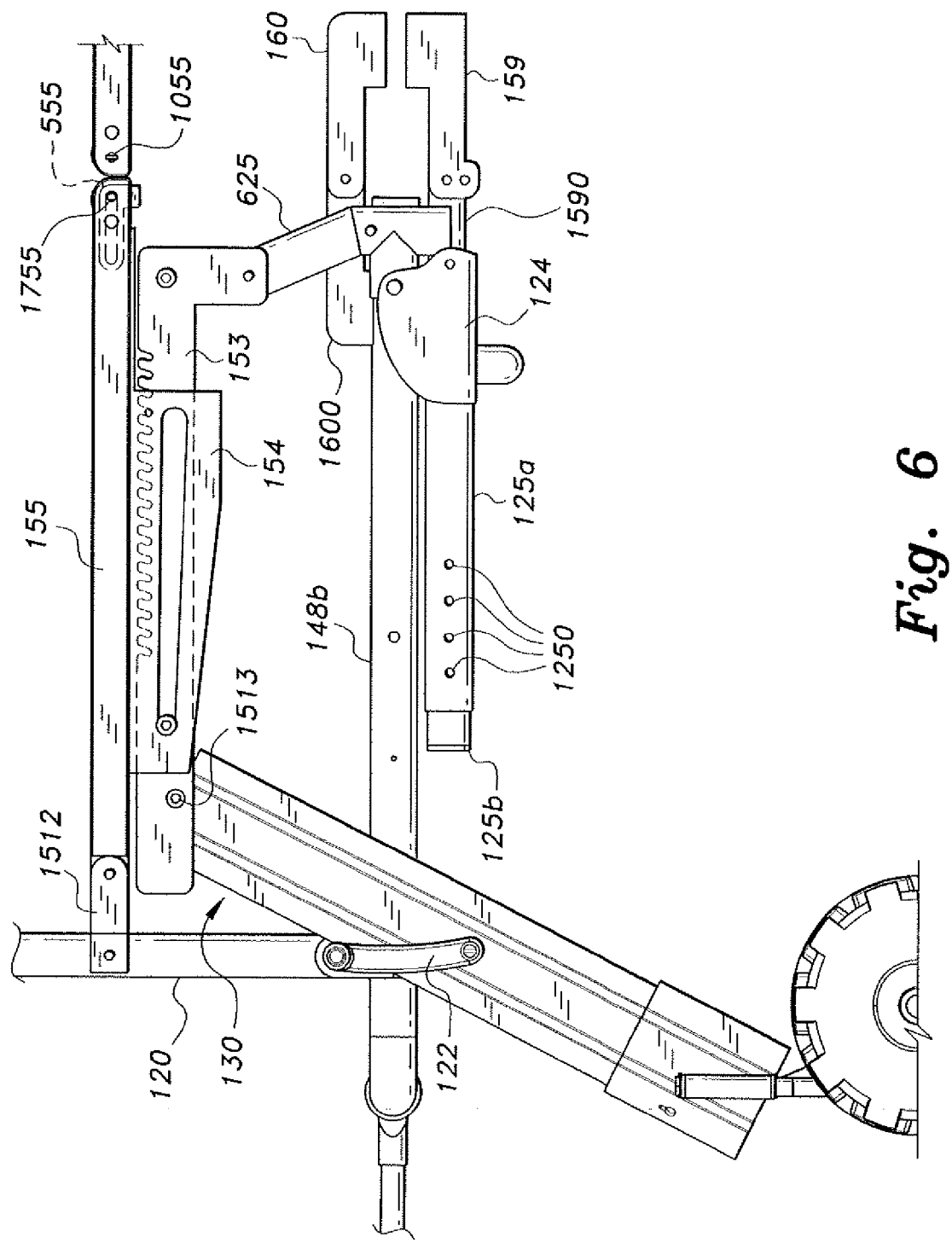
FIG. 6 is a partial side view of the frame and wagon configuration attachment members of the dual-chair beach wagon according to the present invention.

As most clearly shown in FIGS. 4 and 6, the compound coupling bracket 160, 159 has slots at respective longitudinal ends that receive a respective tang portion of a complementary bracket 1600, 1590 disposed on the opposing open ended member 148b of the opposing beach chair. The coupling bracket 160,159 and tang portion of complementary bracket 1600,1590 have holes which can be aligned when the tang is inserted into the slot. Retaining pins can then be disposed through the holes to secure the joint at the tubular members 148b.

As shown in FIGS. 1, 4, and 6, the joint at ratchet arm rest portions 155 is formed by slots 1555 at ends of the rest portions 155. A planar latching mechanism 555 is slidably mounted inside one of the arm rest portions 155 with fixed retaining pin 1755. Opposing arm rest 155 has a sliding retaining pin 1055 that perpendicularly traverses the slot 1555. To form the ratchet arm rest joint, the sliding retaining pin 1055 is displaced to clear the slot 1555 while the planar latching mechanism 555 is slid to engage slot 1555 of the opposing arm rest. Once the open portion of planar latching mechanism 555 is axially aligned with the shaft of the retaining pin 1055, the retaining pin is allowed to push through the open portion of the planar latching mechanism 555 to lock the opposing arm rests together.

As shown in FIG. 3, the fully locked dual beach chair arrangement forms a carriage with seat backs 120 in the fully upright position forming wagon carriage ends 1200 and a compound, substantially rectangular bottom frame 1480 formed by locked seat frames 148b, together with frame end portions 148a. The pivotal seat backs 120 are locked in place by a ratchet pawl assembly 154, which is attached to ratchet arm 155 and drops into place at a desired ratchet slot in stationary ratchet slot member 153.

Figure 5:
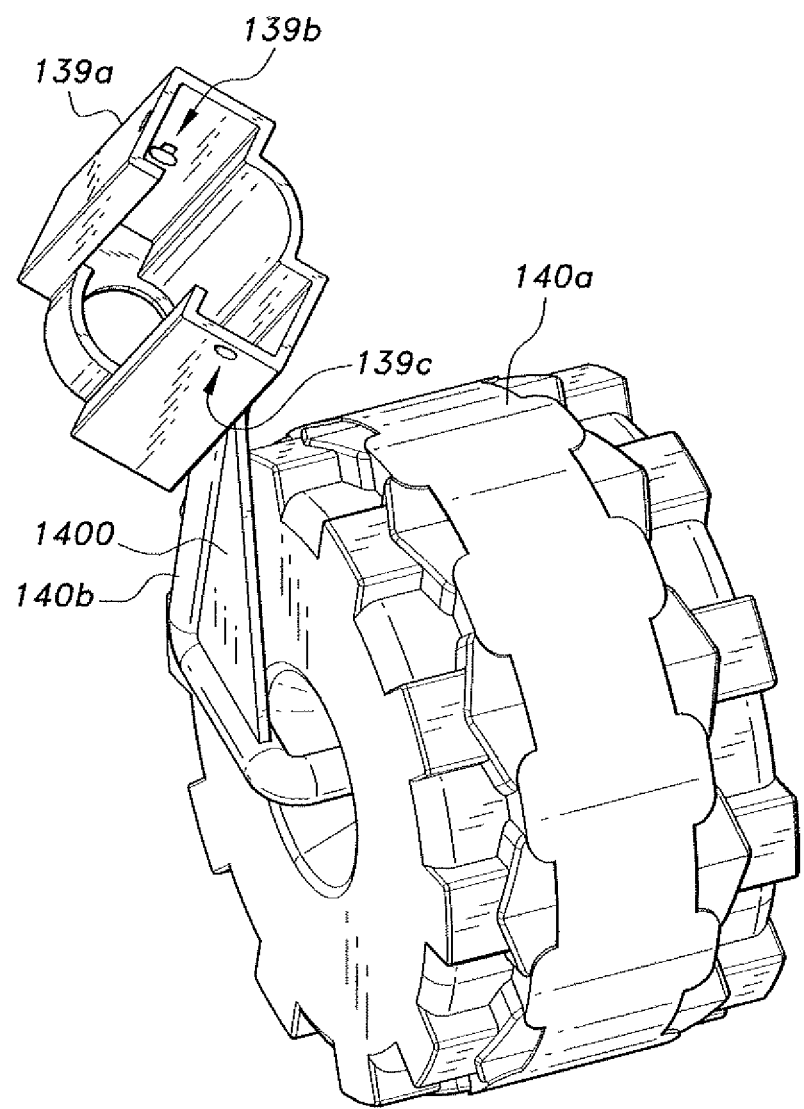
FIG. 5 is a perspective view of the wheel and wheel attachment assembly of the dual-chair beach wagon according to the present invention.

As most clearly shown in FIGS. 3, 4 and 6, the rear leg 130 includes an elongate tubular member 1300a flanked by two elongate angular guide members 1300b and 1300e. The configuration of members 1300a, 1300b, and 1300e forms a multifaceted channel used to guide attachment of the wheel assembly to the leg 130. Each tubular member 1300a may have an attachment bore through which a pin, e.g., a detent pin, may be inserted when the wheel assembly sleeve 139a is attached on leg 130 and wheel assembly bore 139c is aligned with a corresponding attachment bore of the tubular member 1300a. Telescoping rear leg extension members 1300d are slidably disposed in the hollow tubular members 1300a and are adapted for maintaining a user-selected extension beyond the primary leg members 1300a. As most clearly shown in FIG. 5, multifaceted wheel assembly sleeve 139a is of the same shape and slightly larger than the leg assembly shown in FIGS. 4 and 6. For each wheel, the axle 140b is pivotally attached to the wheel assembly attachment sleeve 139a (pivotal for the chair having the pull rod attachment, i.e., the front chair, non-pivotal for the trailing chair).

The axle 140b has a horizontal bend and a vertical bend, which form a bi-planar configuration strengthened by attachment of an axle gusset 1400 at the vertically extending bend. The wheel 140a is attached to the axle at the free end of the horizontally extending portion of the axle 140b. Wheel attachment is performed by sliding the sleeve 139a over the channel formed by leg members 1300a, 1300b, and 1300c, alignment of the wheel assembly attachment bore 139c with a corresponding bore on leg 130, and securing the wheel assembly with a pin through the aligned bores, thereby securing the wheel assembly to the rear leg 130. A lateral reinforcement bar 131 extends between the two rear legs 130 and is attached to each to constrain flexing of the legs. A storage bore 139b is utilized to hang the wheel on the device 110 at wheel storage attachment member 139d (shown as a rivet extending from seat frame portion 140) when the wheel 140a is not in use.

The front legs include a pivotal locking mechanism 61a disposed in a lower bar portion of front leg upper tubular attachment elbow bracket 625 that allows the legs 125a to be folded away into a recess and, alternatively, locked into an extended position. A telescoping lower leg extension 125b is disposed inside of front leg 125a and can be extended to several positions, as determined by front leg detents 1250 disposed along front leg portion 125a. Front leg pivot bracket 124 is rigidly attached to the upper portion of front leg 125a and pivotally attached to perpendicularly extending portion of front leg upper tubular attachment elbow bracket 625, the upper part of elbow bracket 625 being, in turn, pivotally attached to the lower front of ratchet arm ratchet assembly 153. The locking mechanism 61a comprises a V-shaped, resilient, stiff metal detent spring 61a having detent stubs 61b, which are disposed through laterally opposing bores in the lower part of the front leg upper elbow bracket 625. When the leg 125a is swung open, corresponding holes in the pivot bracket 124 align with the detent stubs 61b, allowing the detent stubs 61b to snap into the holes of the pivot bracket 125 to secure the leg 125a into its extended position.

Figure 7:
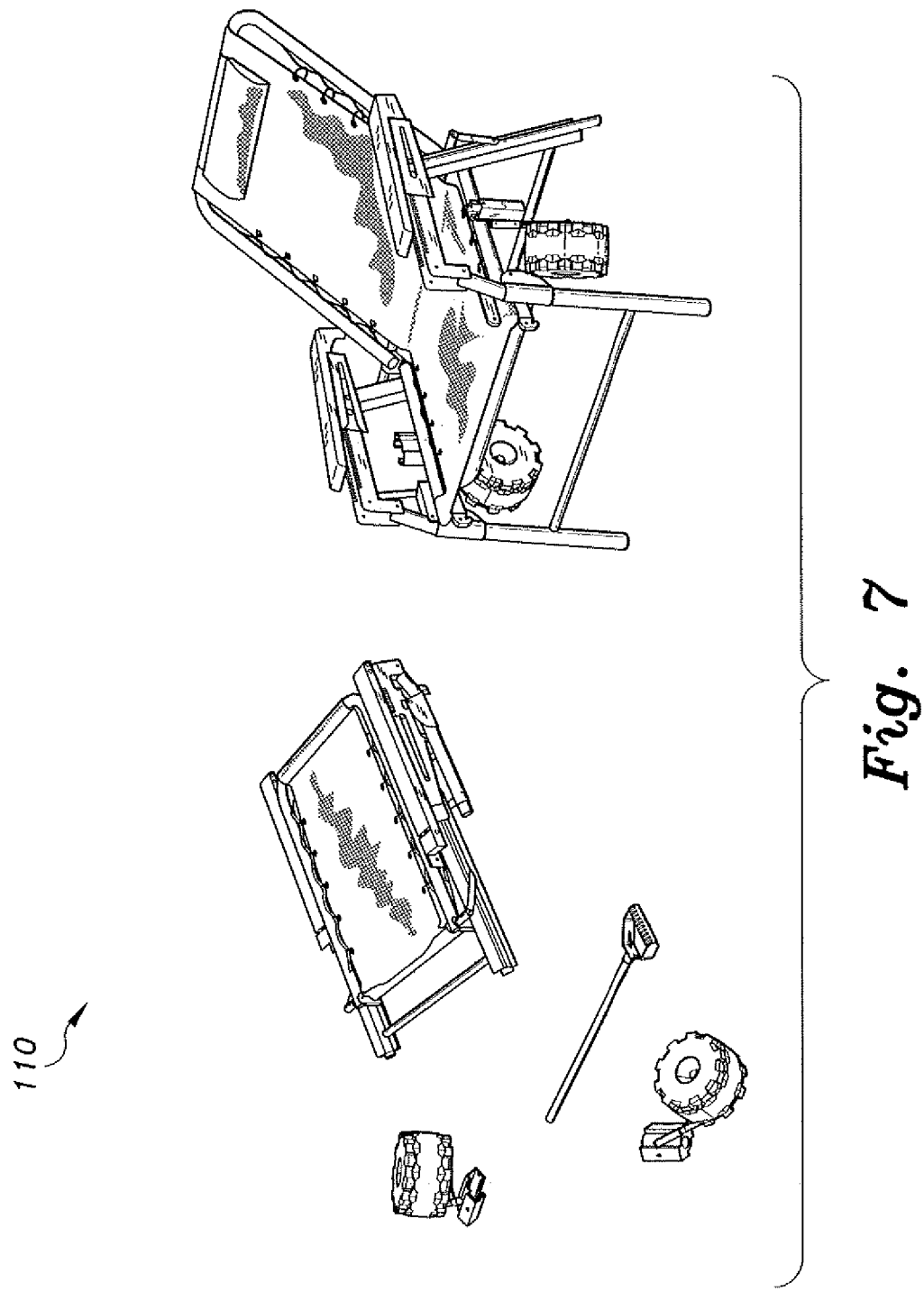
FIG. 7 is an environmental perspective view of the dual-chair beach wagon according to the present invention, showing one chair totally collapsed and one chair fully deployed.

Lastly, as shown in FIG. 7, the chairs of the dual-chair beach wagon system 110 can be separated, partially reclined, or fully collapsed.

It is to be understood that the present invention is not limited to the embodiments described above, but encompasses any and all embodiments within the scope of the following claims.

I claim:

1. A dual-chair beach wagon, comprising:
    first and second collapsible chairs, each of the chairs having a seat frame and a backrest frame;
    rear leg members disposed on each of the first and second collapsible chairs;
    retractable front leg members pivotally attached to the first and second collapsible chairs;
    left and right side armrests attached to and extending forward from respective left and right sides of the backrest frame of each of the first and second collapsible chairs;
    complementary armrest latching mechanisms disposed on a front portion of each of the left and right side armrests, the armrest latching mechanisms removably joining the front portion of the right armrest of the first collapsible chair to the front portion of the left armrest of the second collapsible chair, and joining the front portion of the right armrest of the second collapsible chair to the front portion of the left armrest of the first collapsible chair;
    complementary seat frame latching mechanisms disposed on a front portion of each of the seat frames, the seat frame latching mechanisms removably joining the front portion of the seat frame of the first collapsible chair to the front portion of the seat frame portion of the second collapsible chair;

an elongate pull rod having a handle at one end and a connector at the other end;
a pull rod coupler attached to a rear portion of the seat frame of the first collapsible chair, the pull rod coupler removably receiving the pull rod at the pull rod connector;
a trailing pair of wheel and axle assemblies having an adjustable attachment removably attaching the wheel and axle assemblies to a respective one of the rear leg members of the second collapsible chair; and
a leading pair of wheel and axle assemblies having an adjustable attachment removably attaching the leading wheel and axle assemblies to a respective one of the rear leg members of the first collapsible chair, the leading pair of wheel axles being pivotal within the respective adjustable attachment, thereby facilitating steering of the dual-chair beach wagon when the dual-chair beach wagon is pulled using the pull rod;
wherein the collapsible chairs are alternately configured for stand-alone use as beach chairs or connectable to each other to form a wagon for transport of articles.

2. The dual-chair beach wagon according to claim 1, further comprising an equipment retaining strap attached to the back frames of each of said collapsible chairs, respectively, the retaining straps being aligned and configured for transporting elongate paraphernalia.

3. The dual-chair beach wagon according to claim 1, wherein the armrest latching mechanisms removably joining armrest front portions of the collapsible chairs comprise:
a first slotted planar key slidably attached to said front right armrest of said first collapsible chair;
a tab extending from said first slotted planar key;
a first channel disposed in front portion of the left armrest of said second collapsible chair, the first channel being adapted for receiving the first slotted planar key;
a throughbore extending perpendicularly from an exterior of the left armrest of said second collapsible chair through the first channel; and
a pin adapted for sliding through the throughbore and through the first channel;
wherein when a user pulls the tab to slide the first slotted planar key into the first receiving channel, the armrests can be locked together when the pin is positioned through the armrest throughbore and through the first channel and through slot of the first slotted planar key.

4. The dual-chair beach wagon according to claim 3, wherein the armrest latching mechanisms removably joining armrest front portions of the collapsible chairs comprise:
a second slotted planar key slidably attached to the front right armrest of said second collapsible chair;
a tab extending from the second slotted planar key;
a second channel disposed in the front portion of the left armrest of said first collapsible chair, the second channel being adapted for receiving the second slotted planar key;
a throughbore extending perpendicularly from an exterior of the left armrest of said first collapsible chair through the second channel; and
a pin adapted for sliding through the throughbore and through the second channel;
wherein when a user pulls the tab to slide the second slotted planar key into the second receiving channel, the armrests can be locked together when the pin is positioned through the armrest throughbore and through the second channel and through slot of the second slotted planar key.

5. The dual-chair beach wagon according to claim 1, wherein the seat frame latching mechanisms removably joining seat frame front portions of the collapsible chairs comprise:
first upper and lower slotted receiving members disposed on and extending forward from the left front portion of the seat frame of said second collapsible chair;
throughbores driven through the first slotted receiving members from an exterior of the slotted receiving members and perpendicularly intersecting slots of the first slotted receiving members;
first upper and lower insertive planar members disposed on and extending forward from the right front portion of the seat frame of said first collapsible chair, the first upper and lower insertive planar members having throughbores on a front portion thereof and being adapted for fitting into the slots of the first upper and lower receiving members; and
pins adapted for insertion through throughbores of the first receiving members and the first insertive planar members when the first insertive planar members are aligned in the slots;
whereby the seat frames of said first and second collapsible chairs are securely fastened to each other.

6. The dual-chair beach wagon according to claim 5, wherein the seat frame latching mechanisms removably joining seat frame front portions of the collapsible chairs comprise:
second upper and lower slotted receiving members disposed on and extending forward from left front portion of the seat frame of said first collapsible chair;
throughbores driven through the second slotted receiving members from an exterior of the second slotted receiving members and perpendicularly intersecting slots of the second slotted receiving members;
second upper and lower insertive planar members disposed on and extending forward from right front portion of the seat frame of said second collapsible chair, the second upper and lower insertive planar members having throughbores on a front portion thereof and being adapted for fitting into the slots of the second upper and lower receiving members; and
pins adapted for insertion through throughbores of the second receiving members and the second insertive planar members when the second insertive planar members are aligned in the slots;
whereby the seat frames of said first and second collapsible chairs are securely fastened to each other.

7. The dual-chair beach wagon according to claim 1, further comprising upholstery attached to the seat back frames and to the seat frames of said first and second collapsible chairs.

8. The dual-chair beach wagon according to claim 1, further comprising ratchet and pawl assemblies disposed in said arm rests, allowing a movable portion of said arm rests to be adjusted relative to a fixed portion of said arm rests, thereby allowing angular adjustment of said backrest frame with respect to said seat frame.

9. The dual-chair beach wagon according to claim 8, wherein said front leg members each further comprises:
a front leg pivot bracket having a pivot point and a pair of alignment bores, the front leg pivot bracket attached to the front leg member at an upper portion of said front leg member;
a hollow tubular attachment elbow bracket having an upper part pivotally attached to lower front portion of the arm rest ratchet assembly, and a lower part having opposing throughbores, an extension, extending perpendicularly from upper and lower portions of the elbow forming a pivotal attachment at the pivot point of the front leg pivot bracket;

a spring member with detents disposed inside the lower elbow portion, the detents extending through the opposing throughbores of the elbow; and wherein when said front leg member is pivoted forward, the alignment bores of the front leg pivot bracket swings in alignment with the elbow detents thereby locking the front leg in an extended position.

10. The dual-chair beach wagon according to claim 8, wherein each said rear leg member further comprises:

an elongate tubular member;

two elongate angular members attached lengthwise to the elongate tubular member, forming a guide channel along the length of said rear leg member; and a telescoping leg extension member slidably attached inside the elongate tubular member, the telescoping leg extension adjusting a height of said rear leg above a supporting surface.

11. The dual-chair beach wagon according to claim 10, wherein each said wheel and axle assembly comprises:

a wheel attachment sleeve adapted for fitting over the guide channel of the rear leg member;

first section of axle portion of the wheel and axle assembly attached to and vertically descending from the wheel attachment sleeve;

second section of the axle portion extending perpendicular to and horizontally away from the first axle section; and third section of the axle portion extending perpendicular to and horizontally away from the second axle section, the third section securing the wheel to the axle.

12. The dual-chair beach wagon according to claim 11, wherein said axle portion further comprises a gusset attached to first and second sections of said axle, thereby strengthening said axle.

13. The dual-chair beach wagon according to claim 12, further comprising a rivet extending from said seat frame member, the rivet providing an anchor point to hang said wheel assembly in storage while said collapsible chairs are being used individually.

14. The dual-chair beach wagon according to claim 13, wherein the wheel assembly sleeve further comprises a figure-eight shaped bore adapted for hanging said wheel assembly on said rivet for storage of said wheel assembly.

* * * * *